(12) United States Patent
Nishida et al.

(10) Patent No.: US 8,941,570 B2
(45) Date of Patent: Jan. 27, 2015

(54) ELECTRO-OPTICAL DEVICE, METHOD OF DRIVING ELECTRO-OPTICAL DEVICE, ELECTRONIC APPARATUS, AND PROJECTOR

(75) Inventors: Masakazu Nishida, Chino (JP); Ayae Sawado, Kai (JP)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 13/549,590

(22) Filed: Jul. 16, 2012

(65) Prior Publication Data

US 2013/0027446 A1 Jan. 31, 2013

(30) Foreign Application Priority Data

Jul. 29, 2011 (JP) ................................. 2011-166550

(51) Int. Cl.
*G09G 3/36* (2006.01)
*G09G 3/20* (2006.01)
*G02F 1/1333* (2006.01)

(52) U.S. Cl.
CPC ............ *G09G 3/3648* (2013.01); *G09G 3/2092* (2013.01); *G09G 2310/0232* (2013.01); *G09G 2320/0238* (2013.01); *G09G 2320/0276* (2013.01); *G02F 2001/133337* (2013.01); *G02F 2201/122* (2013.01); *G02F 2201/50* (2013.01)
USPC ............................. 345/87; 345/690; 345/205

(58) Field of Classification Search
CPC .................... G02F 1/133707; G02F 1/133512; G02F 1/133514; G02F 2001/133388; G02F 1/134309; G02F 1/134336; G02F 1/1393; G02F 1/133753; G02F 2001/133742; G02F 2202/023; G02F 1/133711; G02F 1/133723; G09G 3/3648; G09G 3/3611; G09G 3/3614; G09G 3/3696; G09G 2320/0247; G09G 3/3677; G09G 2300/0486; G09G 2310/061; G09G 2320/041; G09G 2320/046; G09G 2300/023; G09G 2300/0852
USPC ............................ 345/205, 690, 87–102, 206
See application file for complete search history.

(56) References Cited

U.S. PATENT DOCUMENTS

| 7,791,680 | B2 | 9/2010 | Lee et al. |
| 8,081,153 | B2 | 12/2011 | Shirasaka et al. |
| 2008/0042956 | A1* | 2/2008 | Hur et al. ........................ 345/92 |
| 2008/0055529 | A1* | 3/2008 | Shirasaka et al. ............. 349/143 |
| 2008/0309837 | A1* | 12/2008 | Abe ................................ 349/37 |
| 2012/0133869 | A1* | 5/2012 | Liao et al. ..................... 349/106 |

FOREIGN PATENT DOCUMENTS

| JP | 2007-316119 A | 12/1920 |
| JP | 4-125617 A | 4/1992 |

(Continued)

*Primary Examiner* — Duc Dinh

(74) *Attorney, Agent, or Firm* — ALG Intellectual Property, LLC

(57) ABSTRACT

An electro-optical device of the invention includes a first substrate and a second substrate facing each other with an electro-optical medium sandwiched therebetween, a pixel region having a plurality of pixels, and an ion trap section having an electrode formed in a region outside of the pixel region. A trapping voltage applied to the electrode of the ion trap section varies in accordance with a calculated voltage value that is calculated from a driving voltage applied to the electro-optical medium in one or a plurality of the pixels serving as a reference. The trapping voltage is set relatively high when the calculated voltage value belongs to a relatively high voltage range, and the trapping voltage is set relatively low when the calculated voltage value belongs to a relatively low voltage range.

20 Claims, 9 Drawing Sheets

(56) References Cited

FOREIGN PATENT DOCUMENTS

| | | |
|---|---|---|
| JP | 6-289408 A | 10/1994 |
| JP | 2007-156416 A | 6/2007 |
| JP | 2007-249105 A | 9/2007 |
| JP | 2008-58497 A | 3/2008 |

* cited by examiner

ELECTRO-OPTICAL DEVICE, METHOD OF DRIVING ELECTRO-OPTICAL DEVICE, ELECTRONIC APPARATUS, AND PROJECTOR

BACKGROUND

1. Technical Field

The present invention relates to an electro-optical device, a method of driving the electro-optical device, an electronic apparatus, and a projector.

2. Related Art

It is known that ionic contamination in a liquid crystal layer causes image sticking (spots and unevenness) in a liquid crystal device. To address this issue, there have been proposals for a plurality of electrodes to be formed in a peripheral region outside of a pixel region, and a voltage is applied across the plurality of electrodes, thereby causing ionic impurities to be adsorbed to the peripheral region (see, for example, JP-A-2007-316119 and JP-A-2007-249105).

In the above ion trap section having a plurality of electrodes, a voltage at least sufficient to cause a response in liquid crystal needs to be applied to the plurality of electrodes in order to trap ionic impurities in a liquid crystal layer. However, when liquid crystal responds in the region in which the ion trap section is provided, the liquid crystal layer is in an alignment state where a bright image is displayed. The ion trap section is arranged immediately outside of the pixel region. Accordingly, when the peripheral area of the pixel region is in a dark display state, contrast of the pixel region decreases under the influence of leakage light from the peripheral region.

SUMMARY

An advantage of some aspects of the invention is that it provides an electro-optical device and a driving method therefor that can suppress a decrease in contrast caused by an ion trap section.

An electro-optical device according to a first aspect of the invention includes a first substrate and a second substrate facing each other with an electro-optical medium sandwiched therebetween, a pixel region having a plurality of pixels, and an ion trap section having an electrode formed in a region outside of the pixel region. A trapping voltage applied to the electrode of the ion trap section varies in accordance with a calculated voltage value that is calculated from a driving voltage applied to the electro-optical medium in one or a plurality of the pixels serving as a reference. The trapping voltage is set relatively high when the calculated voltage value belongs to a relatively high voltage range. The trapping voltage is set relatively low when the calculated voltage value belongs to a relatively low voltage range.

With this configuration, a high trapping voltage is applied to the ion trap section when the driving voltage of the pixel is high, and a low trapping voltage is applied when the driving voltage of the pixel is low. The amount of leakage light of the ion trap section can therefore be decreased when a dark image is displayed in the pixel region, allowing prevention of a decrease in contrast caused by the ion trap section. The trapping voltage is raised when a bright image, with which contrast is hardly influenced by leakage light, is displayed. The trap efficiency of the ion trap section will not be excessively reduced.

The trapping voltage may be set to a first trapping voltage, the first trapping voltage being relatively high, when the calculated voltage value belongs to a first voltage range, the first voltage range being relatively high, and the trapping voltage may be set to a second trapping voltage, the second trapping voltage being relatively low, when the calculated voltage value belongs to a second voltage range, the second voltage range being relatively low. Thus, the trapping voltage may be set to two levels, and the voltage ranges of the driving voltage may be assigned to the two levels.

The more relatively higher the calculated voltage value is, the more relatively higher the trapping voltage is set, and the more relatively lower the calculated voltage value is, the more relatively lower the trapping voltage is set. Thus, the trapping voltage may be set to follow variations of the calculated voltage value.

The trapping voltage may be a direct-current voltage. That is, the trapping voltage may be set as a positive or negative direct-current voltage.

The calculated voltage value may be an average value of driving voltage in the plurality of the pixels serving as the reference. With this configuration, the trapping voltage is set on the basis of the overall brightness of the pixel region, so that the trap efficiency in the ion trap section and the display contrast are brought into balance.

The calculated voltage value may be a minimum value or a maximum value of the driving voltage in the plurality of the pixels serving as the reference. With this configuration, the trapping voltage decreases when a pixel rendered dark is included in the pixels serving as the reference. This setting is suitable for cases where a priority is given to display contrast.

The plurality of the pixels serving as the reference may be a plurality of the pixels located on outermost periphery of the pixel region. With this configuration, the trapping voltage is set on the basis of brightness of the pixels located on the outermost periphery that are likely to be influenced by a decrease in contrast. A decrease in contrast can therefore be suppressed with more reliability.

The plurality of the pixels serving as the reference may be a plurality of the pixels belonging to an area having a width of two to five pixels from a peripheral edge of the pixel region. With this configuration, the trapping voltage is set on the basis of brightness of the plurality of pixels located in the outer periphery that are likely to be influenced by a decrease in contrast. A decrease in contrast can therefore be suppressed with more reliability.

The calculated voltage value may be a minimum value or a maximum value of the driving voltage in all the pixels belonging to the pixel region. With this configuration, the trapping voltage decreases when a dark pixel is included in the pixel region. A decrease in display contrast can therefore be maximally suppressed.

A method of driving an electro-optical device according to a second aspect of the invention is a method of driving an electro-optical device including a first substrate and a second substrate facing each other with an electro-optical medium sandwiched therebetween, a pixel region having a plurality of pixels, and an ion trap section having an electrode formed in a region outside of the pixel region. The method includes, at a time of setting a trapping voltage applied to the electrode of the ion trap section on the basis of a calculated voltage value that is calculated from a driving voltage applied to the electro-optical medium in one or a plurality of the pixels serving as a reference, setting the trapping voltage relatively high when the calculated voltage value belongs to a relatively high voltage range, and setting the trapping voltage relatively low when the calculated voltage value belongs to a relatively low voltage range.

With this driving method, a high trapping voltage is applied to the ion trap section when the driving voltage of the pixel is high, and a low trapping voltage is applied when the driving voltage of the pixel is low. The amount of leakage light of the ion trap section can therefore be decreased when a dark image is displayed in the pixel region, so that a decrease in contrast caused by the ion trap section can be prevented. Moreover, the trapping voltage is raised when a bright image, with which leakage light hardly influences contrast, is displayed. The trap efficiency of the ion trap section will not be excessively reduced.

An electronic apparatus according to a third aspect of the invention includes the above electro-optical device. With this configuration, the electronic apparatus including an optical modulation unit excellent both in display quality and reliability can be provided.

A projector according to a fourth aspect of the invention includes a plurality of the above-described electro-optical devices. The projector also includes an illumination optical system configured to supply a blue light beam, a red light beam, and a green light beam to the plurality of the electro-optical devices, and a projection optical system configured to project the blue light beam, the red light beam, and the green light beam modulated by the electro-optical devices. The correspondence relationship between the calculated voltage value and the trapping voltage varies for each kind of corresponding color light beam. With this configuration, the projector including the optical modulation unit excellent both in display quality and reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
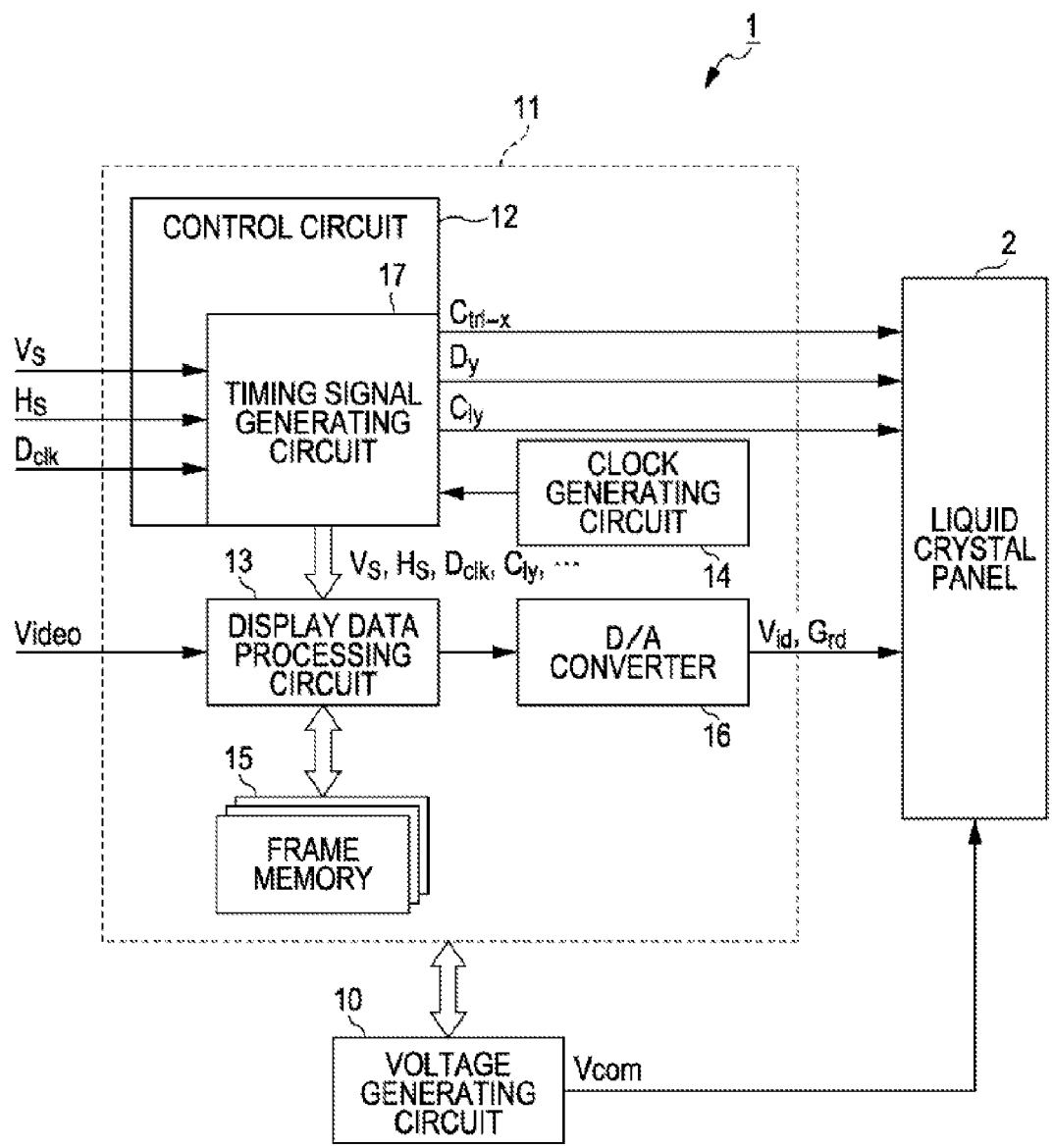
FIG. 1 is a block diagram illustrating a schematic configuration of a liquid crystal device according to a first embodiment.

Embodiments of the invention will be described below with reference to the accompanying drawings. It is to be noted that the scope of the invention is not limited to the following embodiments; any changes may be made without departing from the spirit of the invention. For ease of visual understanding of configurations, the scale of each structure and the number of components in the drawings referred to hereinafter may differ from those in reality.

First Embodiment

Figure 2:
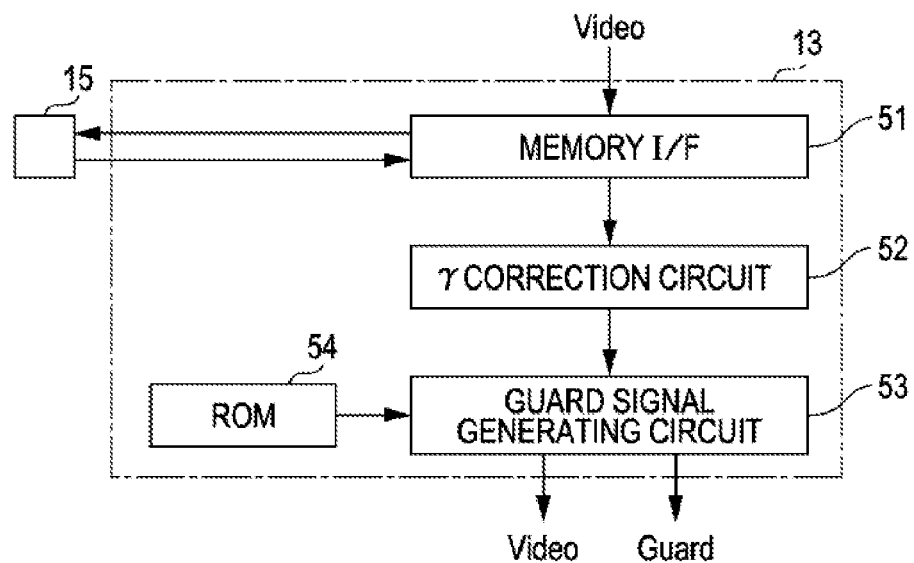
FIG. 2 is a block diagram illustrating a configuration of a display data processing circuit.
Figure 3:
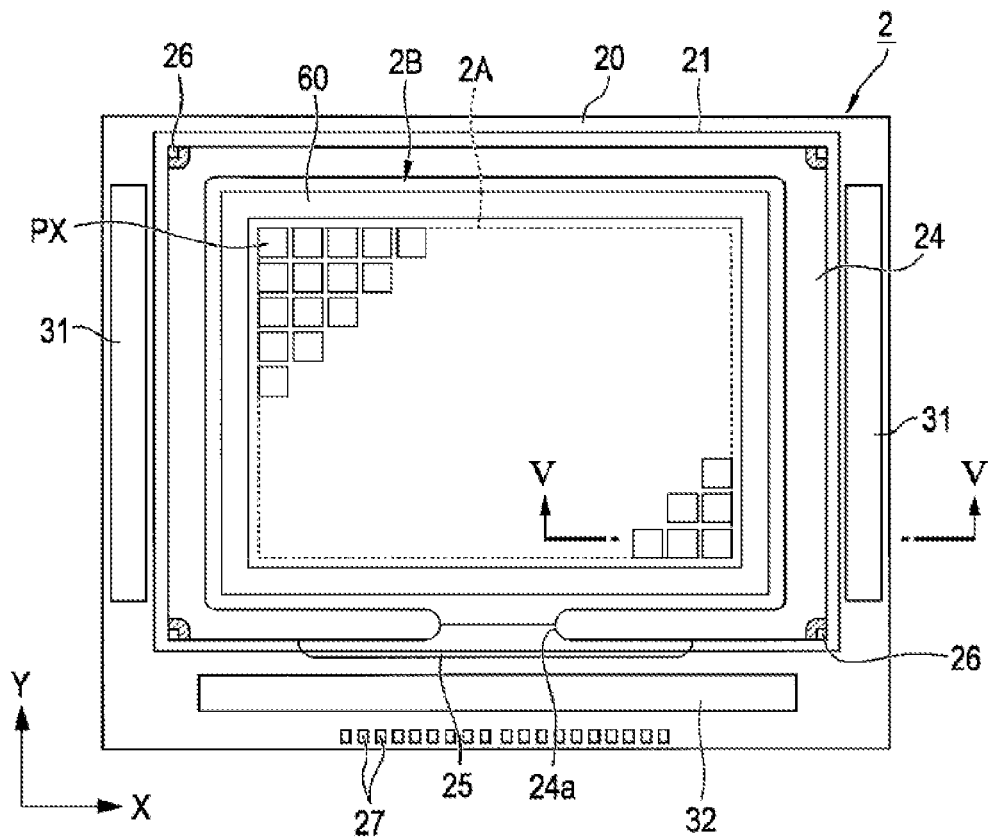
FIG. 3 is a plan view illustrating a schematic configuration of a liquid crystal panel.
Figure 4:
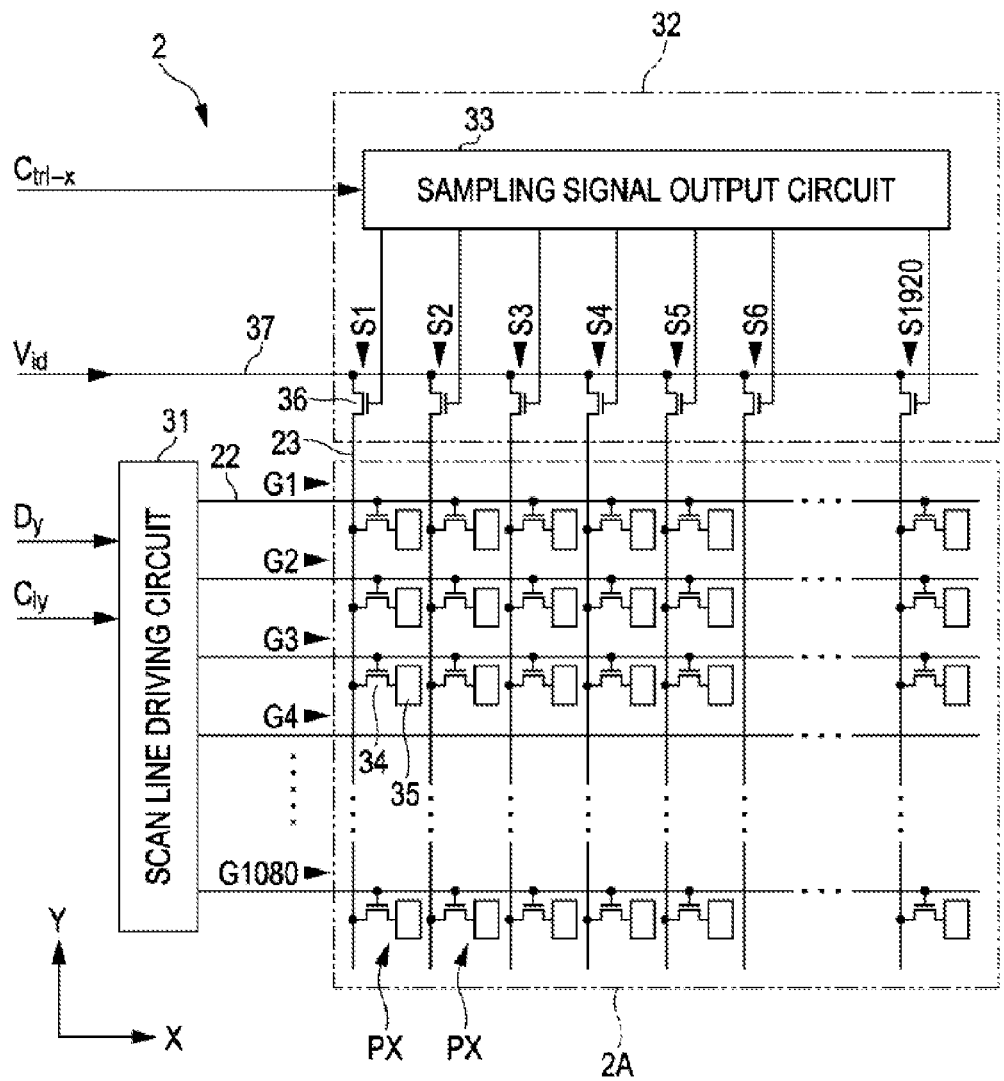
FIG. 4 illustrates a circuit configuration of the liquid crystal panel.

FIG. 1 is a block diagram illustrating a schematic configuration of a liquid crystal device according to a first embodiment. FIG. 2 is a block diagram illustrating a configuration of a display data processing circuit. FIG. 3 is a plan view illustrating a schematic configuration of a liquid crystal panel. FIG. 4 illustrates a circuit configuration of the liquid crystal panel.

A liquid crystal device (electro-optical device) 1 illustrated in FIG. 1 includes a liquid crystal panel 2, a voltage generating circuit 10, and a control device 11. The liquid crystal panel 2 is an active-matrix driven reflection-type liquid crystal panel, for example, and the detailed configuration thereof will be described later.

The voltage generating circuit 10 includes a DC to DC converter or the like. The voltage generating circuit 10 generates direct-current (DC) voltages of a plurality of levels, which are to be used in components of the liquid crystal device 1, under control of the control device 11. For example, the voltage generating circuit 10 generates a common electrode potential Vcom to be applied to a common electrode of the liquid crystal panel 2, and supplies it to the liquid crystal panel 2. Electric power needed for generation of the above various voltages to be performed by the voltage generating circuit 10 is supplied from an power source inside or outside of the liquid crystal device 1, for example.

The control device 11 is composed of a circuit module that controls operation of the liquid crystal panel 2, for example, in response to output of a data signal $V_{id}$. The control device 11 is connected to the liquid crystal panel 2 via a flexible printed circuit (FPC) board, for example. The control device 11 includes a control circuit 12, a display data processing circuit 13, a clock generating circuit 14, a frame memory 15, and a digital-to-analog (D/A) converter 16.

The control circuit 12 comprehensively controls the control device 11 (the display data processing circuit 13 and a timing signal generating circuit 17) and the voltage generating circuit 10. The timing signal generating circuit 17 is built into the control circuit 12. The timing signal generating circuit 17 is connected to the clock generating circuit 14.

The clock generating circuit 14 generates a clock signal serving as a reference for operations of controlling components, and outputs the clock signal to the timing signal generating circuit 17. The timing signal generating circuit 17 generates various control signals for controlling the liquid crystal panel 2 on the basis of the clock signal input from the clock generating circuit 14, and a vertical synchronizing signal $V_S$, a horizontal synchronizing signal $H_S$, and a dot clock signal $D_{clk}$ supplied from an external device (not illustrated). The timing signal generating circuit 17 outputs a control signal $C_{trl-x}$, a trigger signal $D_y$, and a clock signal $C_{ly}$, which have been generated by that timing signal generating circuit 17, to the liquid crystal panel 2. The timing signal generating circuit 17 also outputs the vertical synchronizing signal Vs, the horizontal synchronizing signal $H_S$, the dot clock signal $D_{clk}$, and the like to the display data-processing circuit 13 while carrying out timing adjustment.

The display data processing circuit 13 is connected to the control circuit 12, the frame memory 15, and the D/A converter 16. As illustrated in FIG. 2, the display data processing circuit 13 includes a memory I/F 51, a γ correction circuit 52, a guard signal generating circuit 53, and a storage circuit 54.

The memory I/F 51 sequentially stores display data Video, which is input to the display data-processing circuit 13, in the frame memory 15. The memory I/F 51 reads out the display data Video to be displayed on the liquid crystal panel 2 from the frame memory 15, and outputs the display data Video to the γ correction circuit 52. The display data Video is in the form of image signals defining the gray scale levels of pixels in the liquid crystal panel 2. Components of the display data-processing circuit 13 deliver the display data Video in units of frames.

The γ correction circuit 52 performs gray scale correction of the input display data Video so that the display data Video is made suitable for the display characteristics of the liquid crystal panel 2. The display data Video after γ correction is output to the guard signal generating circuit 53.

The guard signal generating circuit 53 generates a guard signal Guard to be supplied to an ion trap section 60 (see FIG. 3) of the liquid crystal panel 2 from the display data Video input from the γ correction circuit 52. The guard signal generating circuit 53 outputs the generated guard signal Guard together with the display data Video to the D/A converter 16.

The storage circuit 54 is a read only memory (ROM) that stores a look-up table (LUT) to which the guard signal generating circuit 53 refers. The LUT stored in the storage circuit 54 is a table in which the relationship between the display data Video or information calculated from the display data Video and the guard signal Guard is recorded.

The D/A converter 16 converts the display data Video input from the display data processing circuit 13 (the guard signal generating circuit 53) into an analog data signal $V_{id}$ (driving voltage) and converts the Guard signal Guard into an analog guard signal $G_{rd}$ (trapping voltage), and outputs the data signal $V_{id}$ and the guard signal $G_{rd}$ to the liquid crystal panel 2.

While the vertical synchronizing signal $V_S$ has a frequency of 120 Hz (period of 8.33 milliseconds) in this embodiment, application of the present invention is not limited to the frequency of the vertical synchronizing signal $V_S$. The dot clock signal $D_{clk}$ defines a period for which a portion of the display data Video corresponding to one pixel is supplied. That is, the control circuit 12 controls components in synchronization with supply of the display data Video.

The liquid crystal panel 2 includes an element substrate 20 and a counter substrate 21, as illustrated in FIG. 3. The element substrate 20 and the counter substrate 21 are bonded together with a sealing member 24 provided along the periphery of the counter substrate 21. The sealing member 24 has an opening 24a in a portion thereof, and a sealing material 25 is provided in such a manner as to close the opening 24a. Liquid crystal (an electro-optical medium) is enclosed in an area surrounded by the element substrate 20, the counter substrate 21, the sealing member 24, and the sealing material 25.

A pixel region 2A where a plurality of pixels PX are arranged in a matrix in plan view is formed in the center of the area surrounded by the sealing member 24. A region formed in a rectangular frame between the pixel region 2A and the sealing member 24 is a peripheral region 2B that is not used for display.

In the pixel region 2A, 1920×1080 pixels PX are arranged, for example. While a case where 1920 pixels PX are arranged in the X-direction illustrated in FIG. 3 and 1080 pixels PX are arranged in the Y-direction is described in this embodiment, various modifications of the number of pixels PX and the arrangement form of the pixels PX may be made.

In the peripheral region 2B, the ion trap section 60 is formed in a rectangular frame enclosing the pixel region 2A.

The ion trap section 60 is a functional element that causes ionic impurities floating in a liquid crystal layer to be electrically absorbed.

Intersubstrate connecting terminal sections 26 are provided in areas that are positioned outside of the sealing member 24 and in which the element substrate 20 and the counter substrate 21 are superposed with each other (at four corners of the counter substrate 21). The common electrode potential Vcom generated by the voltage generating circuit 10 is supplied to the element substrate 20 and is supplied to the counter substrate 21 via the intersubstrate connecting terminal sections 26.

In this embodiment, the element substrate 20 is larger than the counter substrate 21, and the outer periphery of the element substrate 20 protrudes outward from the counter substrate 21 when the two substrates are bonded together as illustrated in FIG. 3. Two scan line driving circuits 31 and a data line driving circuit 32 are mounted in a portion of the element substrate 20 where the element substrate 20 protrudes from the counter substrate 21. A plurality of external connection terminals 27 are arranged along a side of the element substrate 20 in which the data line driving circuit 32 is mounted. The external connection terminals 27 are connected to the control device 11, for example, via a flexible substrate. The external connection terminals 27 are connected to the scan line driving circuits 31, the data line driving circuit 32, the intersubstrate connecting terminal sections 26, the ion trap section 60, and other components via wiring (not illustrated).

As illustrated in FIG. 4, the scan line driving circuit 31 and the data line driving circuit 32 are connected to the pixel region 2A. A plurality of scan lines 22 and a plurality of data lines 23 that cross each other and extend vertically and horizontally are formed in the pixel region 2A. The pixels PX are formed so as to correspond to the intersections of the scan lines 22 and the data lines 23. Each pixel PX is provided with a switching element 34 having a thin film transistor (TFT) connected to the scan line 22 and the data line 23, and the pixel electrode 35 connected to the switching element 34. The switching elements 34 and the pixel electrodes 35 are formed on the element substrate 20.

The scan lines 22 and the data lines 23 are led to the outside of the pixel region 2A. The scan lines 22 are connected to the scan line driving circuit 31, and the data lines 23 are connected to the data line driving circuit 32. The trigger signal $D_y$ and clock signal $C_{ly}$ generated by the timing signal generating circuit 17 are input to the scan line driving circuit 31. The trigger signal $D_y$ is a signal for defining the start timing of each frame. The clock signal $C_{ly}$ is a signal for defining a timing at which a scanning signal is supplied to each scan line during the period of each frame. The scan line driving circuit 31 supplies scanning signals G1 to G1080 to the plurality of scan lines 22, one line after another, on the basis of the trigger signal $D_y$ and the clock signal $C_{ly}$. When a scanning signal is supplied to a scan line 22, the switching element 34 connected to that scan line 22 is turned on.

The data line driving circuit 32 includes the sampling signal output circuit 33, and data input switches 36 that are provided so as to correspond to the respective data lines 23. A data input wiring line 37 to which the data signal $V_{id}$ is supplied is connected to the sources of the data input switches 36. The data line driving circuit 32 supplies the data signal $V_{id}$ to the data lines 23 in synchronization with an operation of selecting the scan line 22 that is performed by the scan line driving circuit 31.

In the data line driving circuit 32, the control signal $C_{trl-x}$ generated by the timing signal generating circuit 17 is input to the sampling signal output circuit 33. The sampling signal output circuit 33 sequentially turns on the data input switches 36 according to the control signal $C_{trl-x}$. At this point, the data signal $V_{id}$, as serial data containing gray-scale data for each pixel connected to one scan line 22, is supplied to the data input wiring line 37 and the data signal $V_{id}$ is input through the on-state data entry switch 36 to the data line 23. The data signal $V_{id}$ is written into the pixel electrode 35 through the switching element 34 of the pixel PX connected to the scan line 22 being selected.

For example, in the case of writing gray-scale data into the pixel PX located at the i-th row and the j-th column, the data signal $V_{id}$ (gray-scale data) is supplied from the data line driving circuit 32 to the data line 23 in the j-th column at a timing at which a scanning signal is supplied to the scan line 22 in the i-th row. In this way, gray-scale data is written in the pixel electrode 35 through the switching element 34 in the on-state of the pixel PX located at the i-th row and the j-th column.

Figure 5:
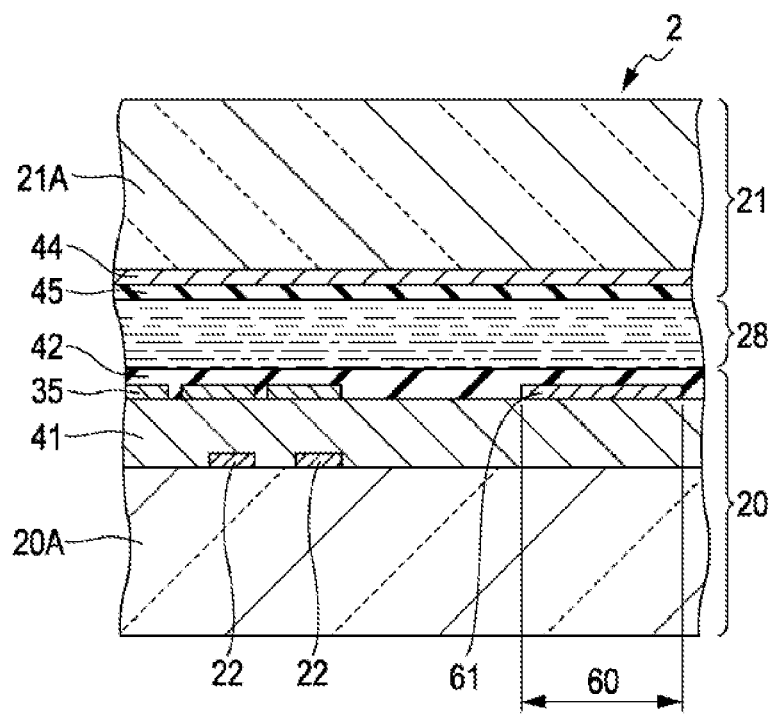
FIG. 5 illustrates a schematic sectional structure of the liquid crystal panel.

FIG. 5 illustrates a schematic sectional structure of the liquid crystal panel positioned along the line V-V of FIG. 3. The liquid crystal panel 2 has a configuration in which the liquid crystal layer 28 is sandwiched between the element substrate 20 and the counter substrate 21 facing each other. The liquid crystal layer 28 is a liquid crystal layer of a vertical alignment (VA) mode made of a liquid crystal material having a negative dielectric anisotropy, for example. The liquid crystal panel 2 of this embodiment is a reflection type liquid crystal panel in which light emitted from a light source or the like passes through the counter substrate 21 and enters the liquid crystal layer 28, and is reflected by the surface of the element substrate 20 and exits from the same side as the incoming light with respect to the liquid crystal panel 2.

The element substrate 20 includes a substrate main body 20A, a circuitry layer 41 formed on the substrate main body 20A, the pixel electrodes 35 and a trapping electrode 61 (the ion trap section 60) that are formed on the circuitry layer 41, and an alignment layer formed over the pixel electrodes 35 and the trapping electrode 61.

The substrate main body 20A is made of a glass substrate, a quartz substrate, a sapphire substrate, a silicon substrate, or the like. The circuitry layer 41 is a layer including various wiring lines such as the scan lines 22 and the data lines 23 and the switching elements 34. The pixel electrode 35 is an island-shaped electrode having a planar region corresponding to the pixel PX. The pixel electrode 35 and the trapping electrode 61 are made of aluminum films or multilayer films of aluminum and indium tin oxide (ITO). The alignment film 42 is an inorganic alignment film made of a silicon oxide, for example.

The counter substrate 21 includes a substrate main body 21A, the common electrode 44 formed on the substrate main body 21A, and an alignment film 45 formed on the common electrode 44. The substrate main body 21A is made of a transparent substrate such as a glass substrate or a quartz substrate. The common electrode 44 is made of a transparent electric conductive material such as ITO. In the case of this embodiment, the common electrode 44 is formed over almost all of one surface of the substrate main body 21A such that the common electrode 44 faces a plurality of pixel electrodes 35 in the pixel region 2A and faces the trapping electrode 61 in the peripheral region 2B. The common electrode 44 is connected to the intersubstrate connecting terminal sections 26 at the corners of the substrate main body 21A. The alignment film 45 is an inorganic alignment film made of a silicon oxide, for example.

The ion trap section 60 of this embodiment includes the trapping electrode 61 in the form of a rectangular frame in plan view, and the common electrode 44 facing the trapping electrode 61 with the liquid crystal layer 28 therebetween, as illustrated in FIG. 3 and FIG. 5. The guard signal $G_{rd}$ (e.g., −5 V to 5 V) is input from the control device 11 to the trapping electrode 61, and the common electrode potential Vcom (e.g., 0 V) is input to the common electrode 44. The ionic impurities in the liquid crystal layer 28 are trapped by an electric field in the thickness direction (the vertical electric field) of the liquid crystal layer 28. The electric field is formed from the potential difference between the trapping electrode 61 and the common electrode 44.

It is to be noted that the specific configuration of the ion trap section 60 is not limited to that described above. For example, there may be used a method of providing a pair of trapping electrodes on the element substrate 20 and applying a voltage between the pair of trapping electrodes (horizontal electric field method). The ion trap section 60 may be made using dummy pixels.

While the ion trap section 60 is provided in the form of a rectangular frame enclosing the pixel region 2A in this embodiment, the configuration may be such that only part of the outer periphery of the pixel region 2A is provided. In other words, the trapping electrode 61 of the ion trap section 60 may be formed in such a manner that the trapping electrode 61 is divided into two pieces or three or more pieces in the longitudinal direction or the lateral direction. In the case of dividing the trapping electrode 61 in the longitudinal direction, trapping electrodes each of which forms an L shape in plan view may be arranged in areas corresponding to four corners of the pixel region 2A, for example. Alternatively, one or two or more trapping electrodes in the form of straight lines that extend along the edge of the pixel region 2A may be arranged. On the other hand, in the case of dividing the trapping electrode 61 in the lateral direction, the configuration can be such that two or three or more trapping electrodes in the form of rectangular frames are provided in the peripheral region 2B. In this case, the ion trap section 60 provided with the trapping electrodes in the form of double frames or triple frames.

Figure 6A:
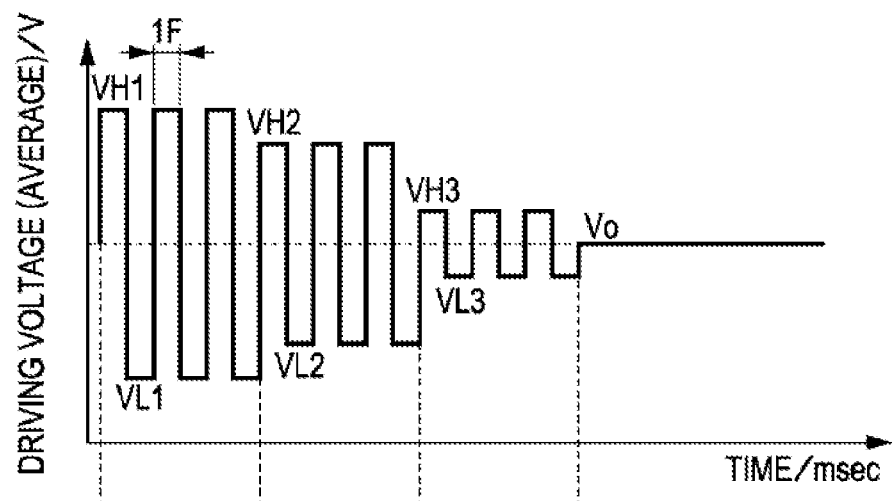
FIGS. 6A and 6B are explanatory diagrams of operations of the liquid crystal device.
Figure 6B:
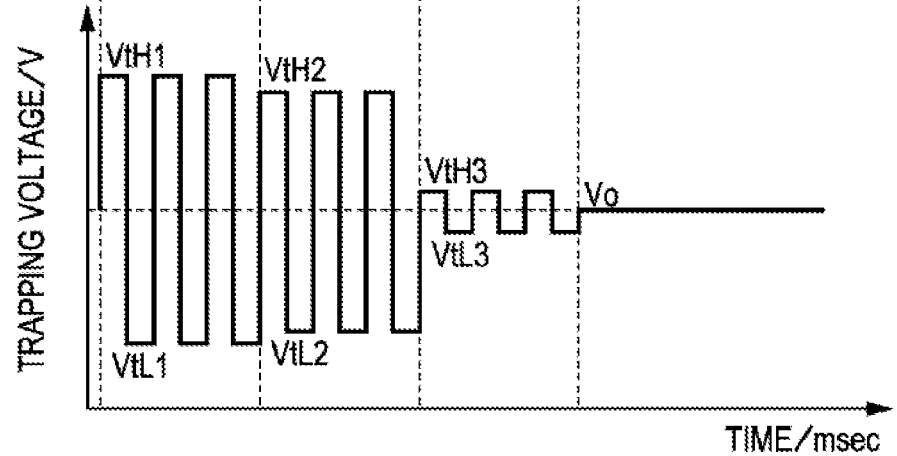

With reference to FIGS. 6A and 6B, operations of the liquid crystal device 1 of this embodiment will be described next. FIGS. 6A and 6B are explanatory diagrams of operations of the liquid crystal device 1. FIG. 6A is a graph schematically representing the time variation of the average value of driving voltage input to the pixel electrode 35 of the pixel PX in an image display operation of the liquid crystal panel 2. FIG. 6B is a graph schematically representing the time variation of the trapping voltage input to the trapping electrode 61 of the ion trap section 60. The vertical axes of the graphs illustrated in FIGS. 6A and 6B represent the voltage (V), and the horizontal axes represent time (msec).

The graph illustrated in FIG. 6A represents states in which the average value of driving voltage varies for each frame period (1F). The average value of driving voltage as used herein means a value obtained by averaging voltages applied to the liquid crystal layer 28 in the pixels PX in the entire pixel region 2A. In the case where the potential of the common electrode 44 is fixed to a reference voltage Vo as in this embodiment, a value obtained by averaging voltages applied to the pixel electrodes 35 in the entire pixel region 2A may be regarded as the above average value of driving voltage.

Image display is performed using frame inversion driving in the liquid crystal device 1 of this embodiment. As represented by the graph, the average value of driving voltage therefore varies between a positive voltage (VH1, VH2, VH3)

and a negative voltage (VL1, VL2, VL3) for each frame, which are reversed with respect to the reference voltage Vo.

The amplitude of the driving voltage in the graph corresponds to the brightness of the whole of a displayed image. With the normally black liquid crystal panel 2 of this embodiment, a relatively bright image is displayed in the pixel region 2A in frames with small amplitudes where the average value of driving voltage is VH1 or VL1. On the other hand, in frames with small amplitude where the average value of driving voltage is VH3 or VL3, a relatively dark image is displayed in the pixel region 2A. An image of intermediate brightness is displayed in a period during which the average value of driving voltage is VH2 or VL2.

In the liquid crystal device 1 of this embodiment, the trapping voltage applied to the trapping electrode 61 of the ion trap section 60 varies in conjunction with the average value of driving voltage, as illustrated in FIG. 6B. Specifically, in frames in which the average value of driving voltage is VH1 (positive high voltage) as illustrated in FIG. 6A, a high voltage VtH1, which is positive with respect to the reference voltage Vo, is applied as a trapping voltage. On the other hand, in frames in which the average value of driving voltage is VL1 (negative high voltage), a high voltage VtL1, which is negative with respect to the reference voltage Vo, is applied as a trapping voltage.

Similarly, in frames in which the average values of driving voltage are a low voltage VH3 and a low voltage VL3, a low voltage VtH3 and a low voltage VtL3 are applied as trapping voltages to the trapping electrode 61, respectively. In frames in which the average values of driving voltage are an intermediate voltage VH2 and an intermediate voltage VL2, an intermediate voltage VtH2 and an intermediate voltage VtL2 are applied as trapping voltages to the trapping electrode 61, respectively.

The display data processing circuit 13 illustrated in FIG. 1 and FIG. 2 performs an operation of setting a trapping voltage to be supplied to the ion trap section 60. Hereinafter, the operation of setting a trapping voltage will be described in more detail.

The display data Video, which is gray scale data of an image displayed on the liquid crystal panel 2, is supplied from an external device to the control device 11 and is input to the display data processing circuit 13, as illustrated in FIG. 1. In the display data processing circuit 13, the display data Video is stored in the frame memory 15 by the memory I/F 51 for every frame. In the frame memory 15, the display data Video for one to several frames is held in accordance with the capacity of the frame memory 15. The display data Video is read out by the memory I/F 51 in the order in which the display data Video is to be displayed, and is output to the γ correction circuit 52.

In the γ correction circuit 52, gray scale correction of the display data Video is performed so that the display data Video is suitable for the display characteristics of the liquid crystal panel 2, and the display data Video after correction is output to the guard signal generating circuit 53.

The guard signal generating circuit 53 calculates an average value Avg of the gray scale data of the display data Video for one frame. Subsequently, the LUT stored in the storage circuit 54 is referred to by using the calculated average value Avg. In the case of this embodiment, the average value Avg of gray scale data and a set gray scale value corresponding to the trapping voltage to be set are held in the LUT of the storage circuit 54.

Here, the average value Avg of gray scale data corresponds to the average value of driving voltage illustrated in FIG. 6A, and the set gray scale value Trp mentioned above corresponds to the trapping voltage illustrated in FIG. 6B.

Subsequently, the guard signal generating circuit 53 outputs the set gray scale value Trp acquired with reference to the LUT as the guard signal Guard to the D/A converter 16. The guard signal generating circuit 53 also outputs the display data Video to the D/A converter 16. The D/A converter 16 converts the input guard signal Guard and display data Video into the analog guard signal $G_{rd}$ and the analog data signal $V_{id}$, respectively, and outputs the analog guard signal $G_{rd}$ and the analog data signal $V_{id}$ to the liquid crystal panel 2.

In the liquid crystal panel 2, the input data signal $V_{id}$ is written into the pixel PX by operations of the scan line driving circuit 31 and the data line driving circuit 32. Thus, the driving voltage based on gray scale data is applied to the liquid crystal layer 28, and, as a result, the pixel PX is displayed with a predetermined level of gray scale. The trapping voltage based on the input guard signal $G_{rd}$ is applied to the trapping electrode 61 of the ion trap section 60. Thus, a voltage corresponding to the set gray scale value Trp is applied to the liquid crystal layer 28 between the trapping electrode 61 and the common electrode 44, and predetermined ion trap operation is performed.

As described above in detail, in the liquid crystal device 1 of this embodiment, the trapping voltage applied to the trapping electrode 61 of the ion trap section 60 varies in accordance with the average value of driving voltage in the pixels PX in the pixel region 2A. This enables a decrease in contrast caused by the ion trap section 60 to be reduced effectively. Hereinafter, such an operation will be described in detail.

First, in the ion trap section 60, ionic impurities are trapped by an electric field formed between the trapping electrode 61 and the common electrode 44. A relatively large electric field therefore acts on the liquid crystal layer 28 in the ion trap section 60, thereby changing the alignment state of liquid crystal. For example, in the normally black liquid crystal panel 2, when a voltage of +5 V is applied to the trapping electrode 61 and a voltage of 0 V is applied to the common electrode 44, the liquid crystal layer 28 in the ion trap section 60 enters an alignment state that is similar to that in the case where the pixels PX in the pixel region 2A are rendered bright.

Usually, a light-shielding film is formed in the peripheral region 2B in which the ion trap section 60 is formed, and therefore significant leakage light does not occur in the ion trap section 60. The ion trap section 60, however, is provided immediately outside of the pixel region 2A. For this reason, if the liquid crystal layer 28 in the ion trap section 60 is nearly rendered bright when a dark image is displayed in the pixel region 2A, light in a slanting direction leaks from the ion trap section 60 into the pixel region 2A and decreases contrast in the outer periphery of the pixel region 2A. On the other hand, when a bright image is displayed in the pixel region 2A, the display quality is hardly influenced by a certain amount of leakage light from the ion trap section 60.

To address this, the liquid crystal device 1 of this embodiment has a configuration in which the voltage applied to liquid crystal layer 28 in the ion trap section 60 varies in accordance with the voltage applied to the liquid crystal layer 28 of the pixel region 2A. That is, as illustrated in FIGS. 6A and 6B, the trapping voltage of the ion trap section 60 is high when the amplitude of the average value of driving voltage in the pixel region 2A is large and a bright image is displayed in the pixel region 2A, whereas the trapping voltage is low when the amplitude of the average value of driving voltage is small and a dark image is displayed in the pixel region 2A.

This enables the amount of leakage light of the ion trap section 60 to be reduced when a dark image is displayed. A decrease in contrast in the pixel region 2A can therefore be suppressed. On the other hand, since there is little influence of leakage light when a bright image is displayed, it is possible to apply a large voltage across the electrodes of the ion trap section 60 to improve the trap efficiency of ionic impurities. As described above, the liquid crystal device 1 of this embodiment allows suppressing of a reduction in the trap efficiency of ionic impurities in the ion trap section 60 while effectively suppressing a reduction in display quality when a dark image is displayed.

While the case of using the normally black liquid crystal panel 2 has been described in this embodiment, the invention can be satisfactorily applied to the case where the liquid crystal panel 2 is a normally white panel. In the case of a normally white liquid crystal panel, the relationship between the gray scale data and the driving voltage of the pixel PX is opposite to that in the case of a normally black liquid crystal panel. However, the relationship between the average value of driving voltage and the trapping voltage illustrated in FIGS. 6A and 6B is the same as that in the case of a normally white liquid crystal panel. Accordingly, in the case of using a normally white liquid crystal panel, the driving method of this embodiment can be implemented using the guard signal generating circuit 53 having exactly the same configuration as this embodiment.

While the set gray scale value Trp is acquired with reference to the LUT stored in the storage circuit 54 in this embodiment, an embodiment in which the set gray scale value Trp is calculated by performing operation processing using the average value Avg may be practiced. In this case, the guard signal generating circuit 53 may be provided with an arithmetic circuit for calculating the set gray scale value Trp from the average value Avg, and therefore a configuration without the storage circuit 54 can be adopted.

When color filters are provided in the pixel PX in the liquid crystal device 1 of this embodiment, the driving method need not be changed. For example, in the case of a direct-view type liquid crystal device provided with the color filters of red, green, and blue, gray scale data of one frame is composed of gray scale data of three colors. At the time of calculating the average value Avg in the guard signal generating circuit 53, the average value of gray scale data may be calculated without distinguishing among the colors.

Second Embodiment

Figure 7A:
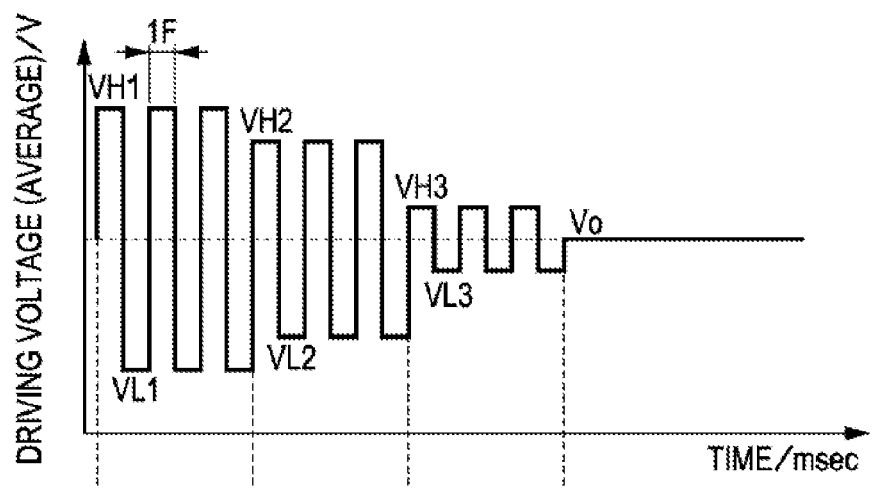
FIGS. 7A and 7B are explanatory diagrams of operations of a liquid crystal device according to a second embodiment.
Figure 7B:
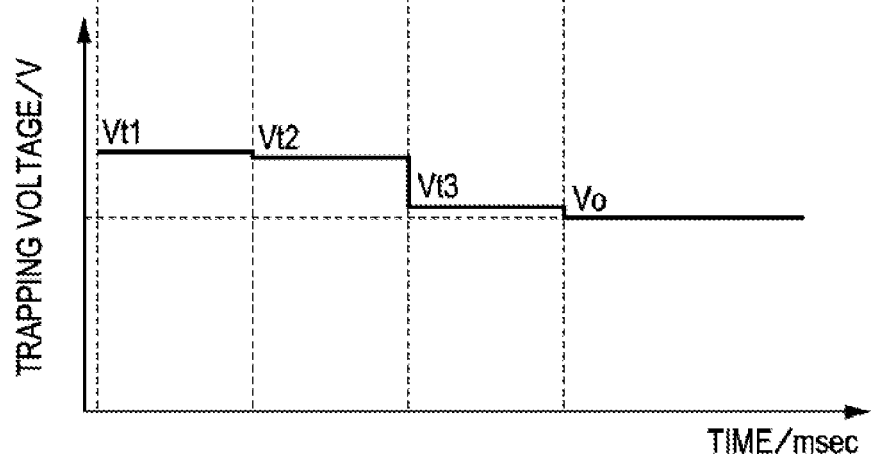

With reference to FIGS. 7A and 7B, a second embodiment will be described next. This embodiment is an example in which operations of the display data processing circuit 13 in the liquid crystal device 1 are changed from those in the first embodiment. FIGS. 7A and 7B are explanatory diagrams of operations of a liquid crystal device according to the second embodiment. FIG. 7A is a graph schematically representing the time variation of the average value of driving voltage input to the pixel electrode 35 of the pixel PX in an image display operation of the liquid crystal panel 2. FIG. 7B is a graph schematically representing the time variation of the trapping voltage input to the trapping electrode 61 of the ion trap section 60. The vertical axes of the graphs illustrated in FIGS. 7A and 7B represent the voltage (V), and the horizontal axes represent time (msec).

As illustrated in FIG. 7B, the trapping voltage applied to the trapping electrode 61 is a DC voltage in the driving method of this embodiment. Specifically, when the average value of driving voltage in the pixels PX is the positive high voltage VH1 or the negative high voltage VL1, a positive high voltage Vt1 is applied as a trapping voltage to the trapping electrode 61. When the average value of driving voltage in the pixels PX is the positive low voltage VH3 or the negative low voltage VL3, a positive low voltage Vt3 is applied as a trapping voltage to the trap electrode 61. When the average value of driving voltage in the pixels PX is the positive intermediate voltage VH2 or the negative intermediate voltage VL2, a positive intermediate voltage Vt2 is applied as a trapping voltage to the trapping electrode 61.

Advantages of the liquid crystal device 1 of this embodiment are exactly the same as those of the first embodiment described above. This is because when a DC voltage is used as the trapping voltage, operations of the liquid crystal layer 28 in the ion trap section 60 are the same as in the case of a driving method using an alternating current voltage as the trapping voltage. Accordingly, this embodiment allows suppressing of a reduction in the trap efficiency of ionic impurities in the ion trap section 60 while effectively suppressing a reduction in display quality when a dark image is displayed.

Note that while the case where the trapping voltage is a positive DC voltage with respect to the reference voltage Vo has been described in this embodiment, the trapping voltage may be a negative DC voltage. In this case, the larger the amplitude of the average value of driving voltage is, the higher the trapping voltage is set, as in this embodiment. The polarity of the trapping voltage may be set in accordance with the polarity of ionic impurities to be trapped.

Third Embodiment

Figure 8A:
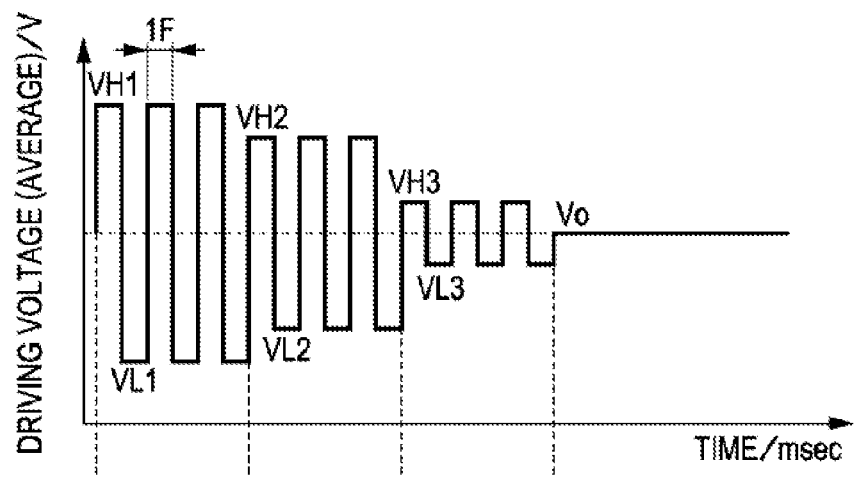
FIGS. 8A and 8B are explanatory diagrams of operations of a liquid crystal device according to a third embodiment.
Figure 8B:
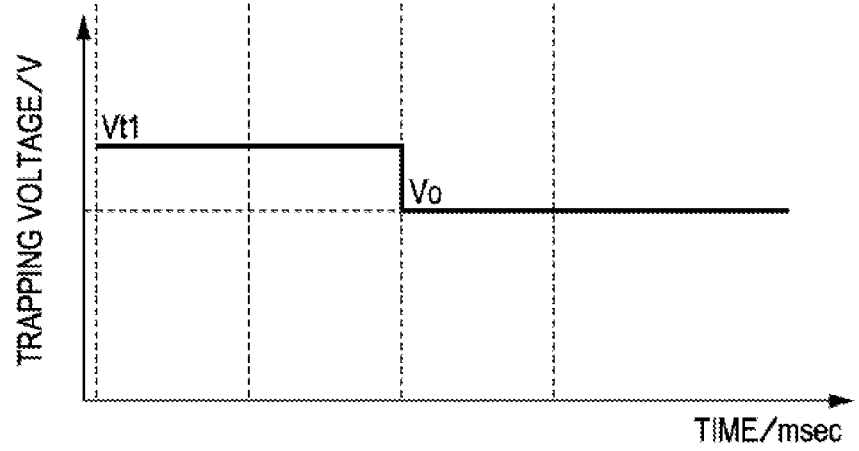

With reference to FIGS. 8A and 8B, a third embodiment will be described next. This embodiment is an example in which operations of the display data processing circuit 13 in the liquid crystal device 1 are changed from those in the first embodiment. FIGS. 8A and 8B are explanatory diagrams of operations of a liquid crystal device according to the third embodiment. FIG. 8A is a graph schematically representing the time variation of the average value of driving voltage input to the pixel electrode 35 of the pixel PX in an image display operation of the liquid crystal panel 2. FIG. 8B is a graph schematically representing the time variation of the trapping voltage input to the trapping electrode 61 of the ion trap section 60. The vertical axes of the graphs illustrated in FIGS. 8A and 8B represent the voltage (V), and the horizontal axes represent time (msec).

As illustrated in FIG. 8B, in the driving method of this embodiment, the trapping voltage applied to the trapping electrode 61 is a DC voltage and is limited to two levels, a level H and a level L. Specifically, when the average value of driving voltage in the pixels PX is any of the positive high voltage VH1, the negative high voltage VL1, the positive intermediate voltage VH2, and the negative intermediate voltage VL2, the positive high voltage Vt1 is applied as a trapping voltage to the trapping electrode 61. On the other hand, when the average value of driving voltage in the pixels PX is the positive low voltage VH3 or the negative low voltage VL3, the reference voltage Vo is applied as a trapping voltage to the trapping electrode 61.

In the case of this embodiment, the voltage applied to the trap electrode 61 is of two kinds, the high voltage Vt1 corresponding to the level H and the reference voltage Vo corresponding to the level L. The thresholds for determining the level to be selected are set to a voltage between the intermediate voltage VH2 and the low voltage VH3 and a voltage between the intermediate voltage VL2 and the low voltage VL3 in the case of this embodiment. These thresholds may be set to any voltages, and the positive threshold and the negative threshold may have different absolute values. While the case where the trapping voltage is a positive DC voltage with respect to the reference voltage Vo has been described in this embodiment, the trapping voltage may be a negative DC voltage.

In the liquid crystal device 1 of this embodiment, leakage light from the ion trap section 60 can be reduced to the least by stopping of application of an voltage to the liquid crystal layer 28 in the ion trap section 60 in a period during which a dark image is displayed. In this period, the display quality is likely to be influenced by leakage light from the ion trap section 60. It is therefore possible to effectively suppress a reduction in display quality when a dark image is displayed. On the other hand, in a period during which a relatively bright image is displayed, ionic impurities can be efficiently trapped by applying of the high voltage Vt1 to the trapping electrode 61.

Fourth Embodiment

Figure 9A:
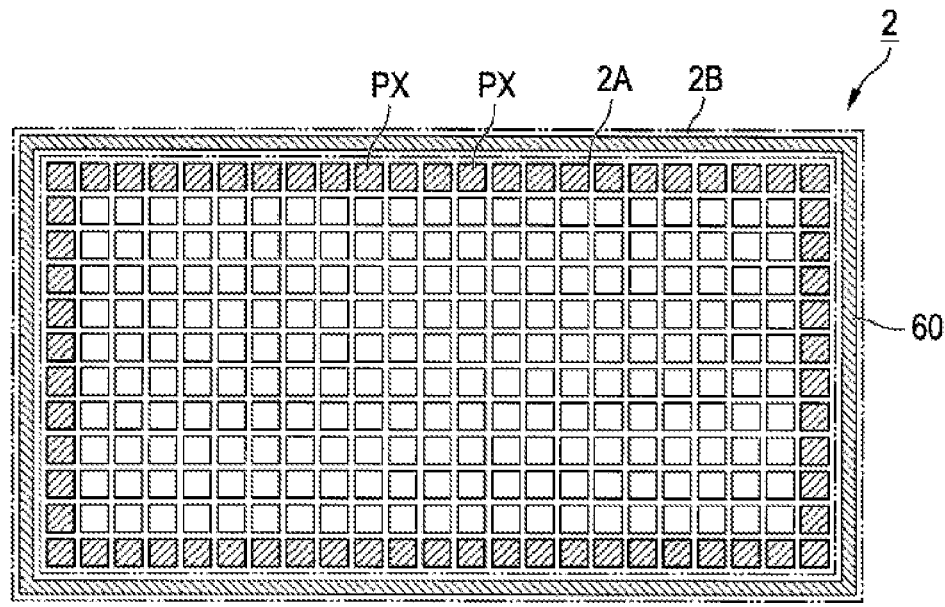
FIGS. 9A and 9B are explanatory illustrations of operations of a liquid crystal device according to the fourth embodiment.
Figure 9B:
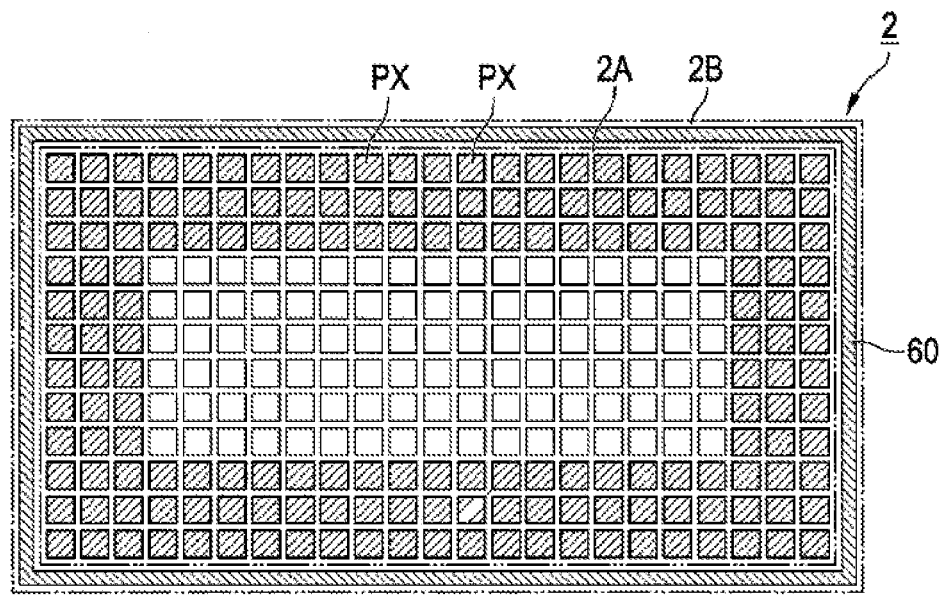

With reference to FIGS. 9A and 9B, a fourth embodiment will be described next. In this embodiment, a description is given of examples in which information on the driving voltage of the pixels PX for use in the display data processing circuit 13 of the liquid crystal device 1 is changed from that in the first embodiment. Hereinafter, first to third examples of the fourth embodiment will be described. FIGS. 9A and 9B are explanatory illustrations of operations of a liquid crystal device according to the fourth embodiment. FIG. 9A is an explanatory illustration for the first example, and FIG. 9B is an explanatory illustration for the second example.

First Example

In the above first to third embodiments, the average value Avg of gray scale data for one frame is used as information on the driving voltage for reference to the LUT stored in the storage circuit 54. In contrast, in the first example of the fourth embodiment, only information on the driving voltage of the pixels located on the outermost periphery of the pixel region 2A is used for reference to the LUT as illustrated in FIG. 9A.

Specifically, in the guard signal generating circuit 53 illustrated in FIG. 2, only the gray scale data corresponding to the pixels PX on the outermost periphery illustrated in FIG. 9A is extracted from the gray scale data for one frame input from the γ correction circuit 52, and an average value Avg1 of the extracted gray scale data is calculated. Then, the LUT stored in the storage circuit 54 is referred to by using the calculated average value Avg1, the set gray scale value Trp of the trapping voltage is acquired, and the set gray scale value Trp is output as the guard signal Guard to the D/A converter 16. Subsequent operations are similar to those of the first embodiment, and therefore a description thereof is omitted here.

As such, in the first example, the trapping voltage of the ion trap section 60 is set low when the pixels PX rendered dark accounts for a large proportion of the pixels PX on the outermost periphery of the pixel region 2A (that is, when the amplitude of the average value of driving voltage is small). In contrast to this, the trapping voltage of the ion trap section 60 is set high when there are many pixels PX rendered bright on the outermost periphery. Note that any of the above first to third embodiments can be used satisfactorily as a method of setting a trapping voltage.

As illustrated in FIG. 9A, the pixels PX located on the outermost periphery of the pixel region 2A (the hatched pixels PX) are adjacent to the ion trap section 60, and is most likely to be influenced by leakage light of the ion trap section 60. Even if light leaks from the ion trap section 60, however, the contrast is hardly influenced when the pixels PX on the outermost periphery are rendered bright. Under the circumstances, when the ion trap section 60 is driven according to the state of the pixels PX on the outermost periphery as in the first example, a decrease in contrast of display can be suppressed with more reliability, and a reduction in the trap efficiency can also be suppressed.

While the trapping voltage is set on the basis of the average value of driving voltage in the pixels PX located on the outermost periphery of the pixel region 2A, other setting methods may be used. For example, in the case where the liquid crystal panel 2 is a normally black liquid crystal panel, the trapping voltage may be set on the basis of the minimum value of driving voltage of the pixels PX located on the outermost periphery of the pixel region 2A. In the case where the liquid crystal panel 2 is a normally white liquid crystal panel, the trapping voltage may be set on the basis of the maximum value of driving voltage of the pixels PX located on the outermost periphery of the pixel region 2A. That is, the trapping voltage may be set on the basis of the luminance of the pixel PX that is rendered the darkest among the pixels on the outermost periphery of the pixel region 2A. In this way, leakage light can be reduced with reliability when there is provided the pixel X rendered black, which is likely to be influenced by leakage light, and therefore a decrease in contrast resulting from leakage light can be prevented with more reliability.

Second Example

The second example of the fourth embodiment is an example using information on the driving voltage of an area having a width of several pixels on the outermost periphery of the pixel region 2A, as illustrated in FIG. 9B. While the pixels PX in the area having a width of three pixels inwardly from the outermost periphery are hatched in FIG. 9B, information on the driving voltage is not limited to this. For example, information on the driving voltage of an area having a width of two pixels may be used, and information on driving voltage of an area having a width of four pixels or five pixels may also be used. The width mentioned above may be set depending on a range on which leakage light of the ion trap section 60 has an influence.

The setting procedure of the trapping voltage in the second example is almost the same as that of the first example. That is, in the guard signal generating circuit 53, only the gray scale data corresponding to the pixels PX that belong to an area having a width of several pixels from the outermost periphery illustrated in FIG. 9B is extracted from the gray scale data for one frame input from the γ correction circuit 52, and an average value Avg2 of the extracted gray scale data is calculated. Then, the LUT stored in the storage circuit 54 is referred to by using the calculated average value Avg2, the set gray scale value Trp of the trapping voltage is acquired, and the set gray scale value Trp is output as the guard signal Guard to the D/A converter 16. Subsequent operations are similar to those of the first embodiment.

In the second example, the trapping voltage of the ion trap section 60 is set low when the pixels PX rendered dark accounts for a large proportion of an area having a width of several pixels on the outermost periphery of the pixel region 2A (that is, when the amplitude of the average value of driving voltage is small). In contrast to this, the trapping voltage of the ion trap section 60 is set high when there are many pixels PX rendered bright in the above area. Note that any of the above first to third embodiments can be used satisfactorily as a method of setting a trapping voltage.

In the second example, the ion trap section 60 is driven according to the state of the pixels PX located in the outer periphery of the pixel region 2A. Compared with the above first to third embodiments, a decrease in contrast of display can be prevented with more reliability, and a reduction in the trap efficiency can also be suppressed.

In the second example, in the case where the liquid crystal panel 2 is a normally black liquid crystal panel, the trapping voltage may be set on the basis of the minimum value of driving voltage of the pixels PX located in the area having a width of several pixels from the outermost periphery of the pixel region 2A. In the case where the liquid crystal panel 2 is a normally white liquid crystal panel, the trapping voltage may be set on the basis of the maximum value of driving voltage of the pixels PX located in the area having a width of several pixels from the outermost periphery of the pixel region 2A. That is, the trapping voltage may be set on the basis of the luminance of the pixel PX rendered the darkest in a predetermined area in the outer periphery of the pixel region 2A. In this way, leakage light can be reduced with reliability when there is provided the pixels PX rendered black, which are likely to be influenced by leakage light, and therefore a decrease in contrast resulting from leakage light can be prevented with more reliability.

Third Example

The third example of the fourth embodiment is an example in which the trapping voltage of the ion trap section 60 is set using the minimum value or the maximum value of driving voltage, but not the average value of driving voltage, as information on the driving voltage.

In the third example, in the guard signal generating circuit 53, the minimum value min is extracted from the gray scale data for one frame input from the γ correction circuit 52. The minimum min of gray scale data as used here corresponds to the minimum value of driving voltage when the liquid crystal panel 2 is a normally black liquid crystal panel, and corresponds to the maximum value of driving voltage when the liquid crystal panel 2 is a normally white liquid crystal panel. Then, the LUT stored in the storage circuit 54 is referred to by using the extracted minimum value min, the set gray scale value Trp of the trapping voltage is acquired, and the set gray scale value Trp is output as the guard signal Guard to the D/A converter 16. Subsequent operations are similar to those of the first embodiment. Note that any of the above first to third embodiments can be used satisfactorily as a method of setting a trapping voltage.

In the third example, the trapping voltage is set on the basis of the luminance of the pixel PX that is the darkest in the pixel region 2A. That is, the trapping voltage is set low when at least one pixel PX rendered dark is included in the pixel region 2A, and the trapping voltage is set high only when the entire pixel region 2A is rendered bright. In the third example, since the trapping voltage is set high only when leakage light of the ion trap section 60 hardly influences contrast, a decrease in contrast can be prevented with more reliability.

Electronic Apparatus

Figure 10:
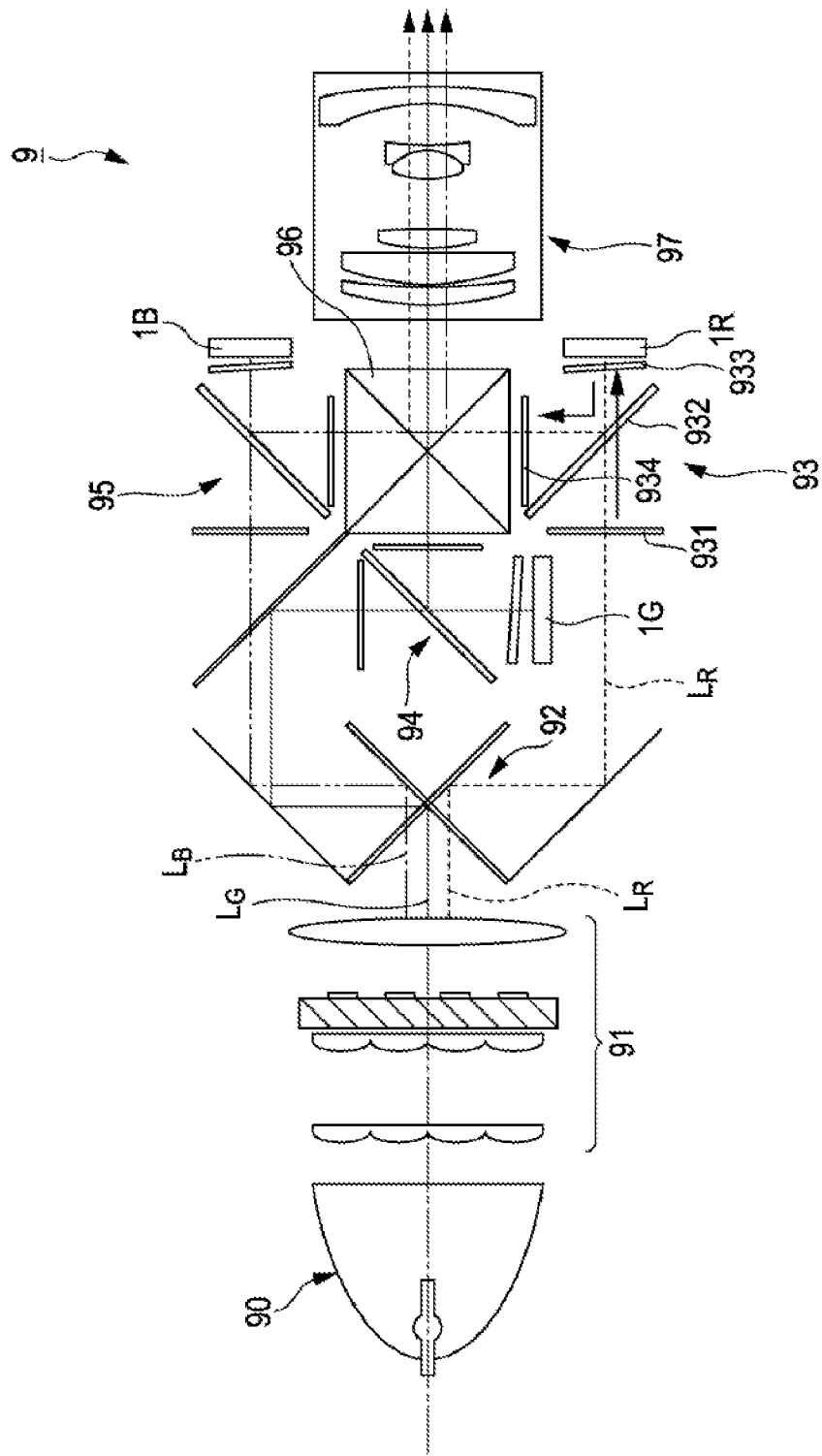
FIG. 10 is a schematic diagram illustrating a schematic configuration of a projector, which is an example of the electronic apparatus.

With reference to FIG. 10, an example of an electronic apparatus to which the liquid crystal device of the present invention is applied will be described next. FIG. 10 is a schematic diagram illustrating a schematic configuration of a projector, which is an example of the electronic apparatus.

A projector 9 illustrated in FIG. 10 includes a light source 90, an integrator optical system 91, a color separation optical system 92, three image formation systems 93 to 95, a color composite element 96, and a projection optical system 97. Each of the three image formation systems 93 to 95 includes the liquid crystal device of the above embodiment.

A source light emitted from the light source 90 enters the integrator optical system 91. The source light that has entered the integrator optical system 91 is subjected to equalization of the illuminance and alignment of the polarization state, and then is emitted therefrom. The source light that has emitted from the integrator optical system 91 is divided into a red light beam $L_R$, a green light beam $L_G$, and a blue light beam $L_B$ by the color separation optical system 92, and the red light beam $L_R$, the green light beam $L_G$, and the blue light beam $L_B$ are supplied to the image formation systems 93, 94, and 95, which are systems different in color, respectively.

The image formation system 93 forms a red image, the image formation system 94 forms a green image, and the image formation system 95 forms a blue image. That is, the color light beams that have entered the image formation systems are modulated to provide image light beams on the basis of display data of an image to be displayed. The image light beams of three colors emitted from the three image formation systems 93, 94, and 95 are composited by the color composite element 96, and then are projected on a projection surface (not illustrated), such as a screen, by the projection optical system 97. In this way, a full color image is displayed on the projection surface.

The three-system image formation systems 93, 94, and 95 have a common configuration. Here, the image formation system 93 for a red image is described. The image formation system 93 includes a liquid crystal device 1R, an entrance side polarizing plate 931, a polarization separation element 932, an optical compensation board 933, and a projection side polarizing plate 934. The entrance side polarizing plate 931 causes P-polarized red light beam, for example, to be transmitted through the polarization separation element 932. The red light beam transmitted through the polarization separation element 932 passes through the optical compensation board 933 and enters the liquid crystal device 1R, where the red light beam is modulated to provide light containing a polarization component (S-polarization with respect to the polarization separation element 932) that represents an image.

The light emitted from the liquid crystal device 1R enters the polarization separation element 932 via the optical compensation board 933. The S-polarization component contained in the light modulated by the liquid crystal device 1R is reflected from the polarization separation element 932 to enter the projection side polarizing plate 934. The above S-polarization component that has entered the projection side polarizing plate 934 is transmitted through the projection side polarizing plate 934 and enters the color composite element 96, and is combined with image light beams of other colors and then is projected.

The projector 9 having the above configuration uses the liquid crystal device 1 of the above embodiment as the liquid crystal device 1R, 1G, or 1B that modulates source light. Thus, the liquid crystal device 1R, 1G, or 1B allows suppressing of a reduction in the trap efficiency of ionic impurities in the ion trap section 60 while effectively suppressing a reduction in display quality when a dark image is displayed. Consequently, the projector 9 of this embodiment enables display with high contrast, and also enables superior reliability to be attained.

In cases where a plurality of liquid crystal devices are provided as in the projector 9 of this embodiment, setting of a trapping voltage may be changed for every color light beam to be modulated. For example, in the liquid crystal device 1B for a blue image, the energy of source light that enters the liquid crystal device 1B is high, and therefore ionic impurities arising because of degradation of the alignment films 42 and 44 are likely to be generated in the liquid crystal panel 2. On the other hand, a blue light beam having low visibility is less likely to be detected by a user if the leakage light occurs. Under the circumstances, regarding the liquid crystal device 1B for a blue image, the trapping voltage may be set such that a priority is given to the trap efficiency of ionic impurities. For example, in the case of the setting method in the first embodiment, when the average value of driving voltage in the pixels PX is the low voltage VH3, the trapping voltage of the liquid crystal device 1B is set higher than that of another liquid crystal device 1R or 1G.

When the trapping voltage is set as mentioned above, the amount of leakage light of the ion trap section 60 will increase when a dark image is displayed in the pixel region 2A, and therefore the contrast of the pixel region 2A becomes more likely to decrease. However, since leakage of a blue light beam has low visibility as mentioned above, a decrease in contrast is unlikely to result in a substantial reduction in display quality. Thus, using this setting method makes it possible to reduce spots and unevenness caused by ionic impurities without substantially reducing display quality.

In the liquid crystal device 1G for a green image, a blue light beam has high visibility, and therefore a decrease in contrast resulting from leakage light is easily detected by a user. Under the circumstances, regarding the liquid crystal device 1G for a green image, the trapping voltage may be set such that a priority is given to preventing leakage light of the ion trap section 60. For example, in the case of the setting method in the first embodiment, when the average value of driving voltage in the pixels PX is the low voltage VH3, the trapping voltage of the liquid crystal device 1G is set lower than that of another liquid crystal device 1R or 1B, or is prevented from being applied.

Setting the trapping voltage as mentioned above allows decreasing of the amount of leakage light of the ion trap section 60 when a dark image is displayed in the pixel region 2A, and therefore a decrease in contrast resulting from leakage light can be further reduced.

The entire disclosure of Japanese Patent Application No. 2011-166550, filed Jul. 29, 2011 is expressly incorporated by reference herein.

What is claimed is:

1. An electro-optical device comprising:
  a first substrate and a second substrate facing each other with an electro-optical medium sandwiched therebetween;
  a pixel region having a plurality of pixels; and
  an ion trap section having an electrode formed in a region outside of the pixel region,
  wherein
    a trapping voltage applied to the electrode of the ion trap section varies in accordance with a calculated voltage value that is calculated from a driving voltage applied to the electro-optical medium in one or a plurality of the pixels serving as a reference,
    the trapping voltage is set relatively high when the calculated voltage value belongs to a relatively high voltage range,
    the trapping voltage is set relatively low when the calculated voltage value belongs to a relatively low voltage range, and
    the plurality of the pixels serving as the reference are a plurality of the pixels located on an outermost periphery of the pixel region.

2. The electro-optical device according to claim 1, wherein the trapping voltage is set to a first trapping voltage, the first trapping voltage being relatively high, when the calculated voltage value belongs to a first voltage range, the first voltage range being relatively high, and
  the trapping voltage is set to a second trapping voltage, the second trapping voltage being relatively low, when the calculated voltage value belongs to a second voltage range, the second voltage range being relatively low.

3. The electro-optical device according to claim 1, wherein the more relatively higher the calculated voltage value is, the more relatively higher the trapping voltage is set, and
  the more relatively lower the calculated voltage value is, the more relatively lower the trapping voltage is set.

4. The electro-optical device according to claim 1, wherein the trapping voltage is a direct-current voltage.

5. The electro-optical device according to claim 1, wherein the calculated voltage value is an average value of driving voltage in the plurality of the pixels serving as the reference.

6. The electro-optical device according to claim 1, wherein the calculated voltage value is a minimum value or a maximum value of the driving voltage in the plurality of the pixels serving as the reference.

7. The electro-optical device according to claim 1, wherein the calculated voltage value is a minimum value or a maximum value of the driving voltage in all the pixels belonging to the pixel region.

8. A method of driving an electro-optical device including a first substrate and a second substrate facing each other with an electro-optical medium sandwiched therebetween, a pixel region having a plurality of pixels, and an ion trap section having an electrode formed in a region outside of the pixel region, the method comprising:
  at a time of setting a trapping voltage applied to the electrode of the ion trap section on the basis of a calculated voltage value that is calculated from a driving voltage applied to the electro-optical medium in one or a plurality of the pixels serving as a reference,
  setting the trapping voltage relatively high when the calculated voltage value belongs to a relatively high voltage range; and
  setting the trapping voltage relatively low when the calculated voltage value belongs to a relatively low voltage range,
  wherein the plurality of the pixels serving as the reference are a plurality of the pixels located on an outermost periphery of the pixel region.

9. An electronic apparatus comprising the electro-optical device according to claim 1.

10. A projector comprising a plurality of the electro-optical devices according to claim 1, the projector including
  an illumination optical system configured to supply a blue light beam, a red light beam, and a green light beam to the plurality of the electro-optical devices, and
  a projection optical system configured to project the blue light beam, the red light beam, and the green light beam modulated by the electro-optical devices,
  wherein a correspondence relationship between the calculated voltage value and the trapping voltage varies for each kind of corresponding color light beam.

11. An electro-optical device comprising:
  a first substrate and a second substrate facing each other with an electro-optical medium sandwiched therebetween;

a pixel region having a plurality of pixels; and
an ion trap section having an electrode formed in a region outside of the pixel region,
wherein
a trapping voltage applied to the electrode of the ion trap section varies in accordance with a calculated voltage value that is calculated from a driving voltage applied to the electro-optical medium in one or a plurality of the pixels serving as a reference,
the trapping voltage is set relatively high when the calculated voltage value belongs to a relatively high voltage range,
the trapping voltage is set relatively low when the calculated voltage value belongs to a relatively low voltage range, and
the plurality of the pixels serving as the reference are a plurality of the pixels belonging to an area having a width of two to five pixels from a peripheral edge of the pixel region.

12. The electro-optical device according to claim 11, wherein
the trapping voltage is set to a first trapping voltage, the first trapping voltage being relatively high, when the calculated voltage value belongs to a first voltage range, the first voltage range being relatively high, and
the trapping voltage is set to a second trapping voltage, the second trapping voltage being relatively low, when the calculated voltage value belongs to a second voltage range, the second voltage range being relatively low.

13. The electro-optical device according to claim 11, wherein
the more relatively higher the calculated voltage value is, the more relatively higher the trapping voltage is set, and
the more relatively lower the calculated voltage value is, the more relatively lower the trapping voltage is set.

14. The electro-optical device according to claim 11, wherein the trapping voltage is a direct-current voltage.

15. The electro-optical device according to claim 11, wherein the calculated voltage value is an average value of driving voltage in the plurality of the pixels serving as the reference.

16. The electro-optical device according to claim 11, wherein the calculated voltage value is a minimum value or a maximum value of the driving voltage in the plurality of the pixels serving as the reference.

17. The electro-optical device according to claim 11, wherein the calculated voltage value is a minimum value or a maximum value of the driving voltage in all the pixels belonging to the pixel region.

18. An electronic apparatus comprising the electro-optical device according to claim 11.

19. A projector comprising a plurality of the electro-optical devices according to claim 11, the projector including
an illumination optical system configured to supply a blue light beam, a red light beam, and a green light beam to the plurality of the electro-optical devices, and
a projection optical system configured to project the blue light beam, the red light beam, and the green light beam modulated by the electro-optical devices,
wherein a correspondence relationship between the calculated voltage value and the trapping voltage varies for each kind of corresponding color light beam.

20. A method of driving an electro-optical device including a first substrate and a second substrate facing each other with an electro-optical medium sandwiched therebetween, a pixel region having a plurality of pixels, and an ion trap section having an electrode formed in a region outside of the pixel region, the method comprising:
at a time of setting a trapping voltage applied to the electrode of the ion trap section on the basis of a calculated voltage value that is calculated from a driving voltage applied to the electro-optical medium in one or a plurality of the pixels serving as a reference,
setting the trapping voltage relatively high when the calculated voltage value belongs to a relatively high voltage range; and
setting the trapping voltage relatively low when the calculated voltage value belongs to a relatively low voltage range,
wherein the plurality of the pixels serving as the reference are a plurality of the pixels belonging to an area having a width of two to five pixels from a peripheral edge of the pixel region.

* * * * *